United States Patent
Reif et al.

(10) Patent No.: US 7,932,346 B2
(45) Date of Patent: Apr. 26, 2011

(54) SYNTHETIC RUBBER WITH NARROW MOLECULAR WEIGHT DISTRIBUTION, A PROCESS FOR ITS PREPARATION AND A METHOD OF USE

(75) Inventors: Lothar Reif, Dormagen (DE); Stephen Pask, Dormagen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 12/795,035

(22) Filed: Jun. 7, 2010

(65) Prior Publication Data

US 2010/0249351 A1    Sep. 30, 2010

Related U.S. Application Data

(62) Division of application No. 11/636,944, filed on Dec. 11, 2006, now Pat. No. 7,763,703.

(30) Foreign Application Priority Data

Dec. 21, 2005   (DE) .................. 10 2005 061 627

(51) Int. Cl.
*C08G 64/00*   (2006.01)
*C08G 63/02*   (2006.01)

(52) U.S. Cl. ....... 528/272; 264/444; 264/464; 521/45.5; 523/150; 523/209; 523/212; 523/351; 528/317; 528/492; 528/493; 528/271; 528/480

(58) Field of Classification Search .................. 264/444, 264/464; 521/45.5; 523/150, 209, 212, 351; 524/317, 492, 493; 528/271, 272, 480
See application file for complete search history.

(56) References Cited

U.S. PATENT DOCUMENTS

| | | | |
|---|---|---|---|
| 3,700,637 | A | 10/1972 | Finch, Jr. |
| 4,464,515 | A | 8/1984 | Rempel et al. |
| 4,503,196 | A | 3/1985 | Rempel et al. |
| 4,581,417 | A | 4/1986 | Buding et al. |
| 4,631,315 | A | 12/1986 | Buding et al. |
| 4,746,707 | A | 5/1988 | Fiedler et al. |
| 4,795,788 | A | 1/1989 | Himmler et al. |
| 4,812,528 | A | 3/1989 | Rempel et al. |
| 4,978,771 | A * | 12/1990 | Fiedler et al. |
| 5,258,413 | A * | 11/1993 | Isayev |
| 6,391,931 | B1 * | 5/2002 | Gehlsen et al. ................. 521/50 |
| 6,683,136 | B2 * | 1/2004 | Guo et al. |
| 2002/0139461 | A1 * | 10/2002 | Pyle et al. .................. 152/209.5 |

FOREIGN PATENT DOCUMENTS

| | | | |
|---|---|---|---|
| DE | 2539132 | * | 3/1977 |
| EP | 0471250 | * | 2/1992 |
| WO | 9738019 | * | 10/1997 |

OTHER PUBLICATIONS

European Search Report from co-pending Application EP06025544.5 dated Mar. 29, 2007, 3 pages.
Suslick, K.S., "Applications of Ultrasound to Materials Chemistry", Annual Review of Materials Science, Annual Reviews Inc., Palo Alto, CA, US, Bd. 29, 1999, Seiten 295-326, XP000986784 ISSN: 0084-6600 *Seite 298-301*.

* cited by examiner

*Primary Examiner* — Terressa M Boykin
(74) *Attorney, Agent, or Firm* — Nicanor A. Kohncke

(57) ABSTRACT

A novel process is used to prepare synthetic rubbers (B) which feature very narrow molecular weight distribution and a correspondingly low value for the polydispersity index. The preparation process encompasses the treatment of a synthetic rubber with ultrasound, where the resultant synthetic rubber (B) has a lower weight-average molecular weight ($M_w$) than the synthetic rubber (A) used. The resultant synthetic rubbers (B) have excellent suitability for processing via extruder processes or injection-molding processes.

12 Claims, No Drawings

SYNTHETIC RUBBER WITH NARROW MOLECULAR WEIGHT DISTRIBUTION, A PROCESS FOR ITS PREPARATION AND A METHOD OF USE

CROSS-REFERENCE TO RELATED APPLICATIONS

This Application is a Divisional of application Ser. No. 11/636,944, filed Dec. 11, 2006, which issued as U.S. Pat. No. 7,763,703, which claims priority to German application No. 10 2005 061 627.5, filed Dec. 21, 2005, all incorporated by reference as if fully set forth herein. This Application is related to application Ser. No. 11/636,837, filed Dec. 11, 2006, which issued as U.S. Pat. No. 7,737,193, which claims priority to German Application No. 10 2005 061 628.3, filed Dec. 21, 2005 and which are hereby incorporated by reference.

FIELD OF THE INVENTION

The invention relates to a process for preparation of low-molecular-weight synthetic rubbers with narrow molecular weight distribution via ultrasound treatment of starting polymers of the respective chemical structure with broad molecular weight distribution.

BACKGROUND OF THE INVENTION

Synthetic rubber with a very wide variety of different chemical structures is prepared by a very wide variety of polymerization processes and treatment processes. Ullmann's Encyclopaedia of Industrial Chemistry, VCH Weinheim, 1993, Vol. A23, pp. 239 et seq., and references cited therein.

A feature shared by most of these synthetic rubbers is that they have a high molecular weight in conjunction with a broad molecular weight distribution. This broad molecular weight distribution is a consequence of the fact that the great majority of synthetic rubbers is obtained in a free-radical polymerization process which generally gives polydispersity indices $D=M_w/M_n$, where $M_w$ is the weight-average molecular weight and $M_n$ is the number-average molecular weight, greater than 1.5, and indeed normally in the case of emulsion rubbers greater than 3.0. The polydispersity index D (method of determination: gel permeation chromatography (GPC) against polystyrene equivalents) gives information about the breadth of molecular weight distribution.

Anionic polymerization in solution in principle gives narrower molecular weight distributions, usual polydispersity indices D here being only a little above 1.0, those of commercially obtainable polymers, e.g. solution styrene-butadiene rubber (LSBR) being typically around the value $D=2.0$. However, this process is applicable only to a small number of the numerous synthetic rubbers with different chemical structures.

The process known as "living radical polymerization", essentially developed in the last decade, is intended for preparation of narrowly distributed polymers by a free-radical-initiated process. However, apart from a few exceptions there are still no commercial applications of this technique, which is complicated when compared with standard processes. An overview of the current prior art is given by Matyjaszewski (Advances in Polymer Science, Vol. 159, Springer-Verlag Berlin Heidelberg 2002, pp. 2-166).

In the rubber sector, mouldings produced from narrowly distributed polymers have a better property profile when compared with conventional components. This is attributable to a more homogeneous network having a smaller number of what are known as loose ends. This becomes particularly marked on comparison of narrowly distributed solution SBR prepared using an anionic technique with the corresponding product from free-radical polymerization (emulsion SBR).

SUMMARY OF THE INVENTION

It was therefore an object of the present invention to provide a process which can prepare a synthetic rubber which has a narrower molecular weight distribution or respectively a smaller polydispersity index than the rubbers known hitherto, and which at the same time also has low values for weight-average molecular weight.

Surprisingly, it has been found that the molecular weight of synthetic rubbers can advantageously be degraded via the effect of ultrasound and that it is possible to provide synthetic rubbers with reduced molecular weight which also have markedly narrower molecular weight distribution and therefore a smaller polydispersity index than is possible in many cases via polymerization processes.

DETAILED DESCRIPTION OF THE INVENTION

The present invention therefore provides a process for the preparation of a synthetic rubber (B), characterized in that a synthetic rubber (A) is exposed to the effect of ultrasound, where the resultant synthetic rubber (B) has a lower weight-average molecular weight ($M_w$) than the synthetic rubber (A).

The inventive process uses synthetic rubbers (A) as starting materials. Examples of suitable materials are:

| | |
|---|---|
| NBR | nitrile rubbers in the form of butadiene-acrylonitrile co- or terpolymers, |
| HNBR | partially or fully hydrogenated nitrile rubbers in the form of hydrogenated butadiene-acrylonitrile co- or terpolymers, |
| XNBR | carboxylated nitrile rubbers, |
| HXNBR | partially or fully hydrogenated carboxylated nitrile rubbers, |
| EVM | ethylene-vinyl acetate copolymers, |
| EPDM | ethylene-propylene-diene copolymers, |
| ESBR | styrene-butadiene copolymers, |
| CR | polychloroprene, |
| BR | polybutadiene, |
| ACM | acrylate rubber, |
| FKM | fluororubber, |
| IIR | isobutylene-isoprene copolymers, usually with isoprene contents of from 0.5 to 10% by weight, |
| BIIR | brominated isobutylene-isoprene copolymers, usually with bromine contents of from 0.1 to 10% by weight, |
| CIIR | chlorinated isobutylene-isoprene copolymers, usually with chlorine contents of from 0.1 to 10% by weight, |
| ABR | butadiene-$C_{1-4}$-alkyl acrylate copolymers, |
| IR | polyisoprene, |
| X-SBR | carboxylated styrene-butadiene copolymers |
| EAM | ethylene-acrylate copolymers, |
| CO and ECO | epichlorohydrin rubbers, |
| Q | silicone rubbers, |
| AU | polyester urethane polymers, |
| EU | polyether urethane polymers, |
| ENR | epoxidized natural rubber or a mixture thereof. |

Nitrile Rubbers (NBR)

For the purposes of this application, nitrile rubbers, also known by the abbreviated term NBR, are co- or terpolymers which contain repeat units and at least one conjugated diene, of at least one α,β-unsaturated nitrile and, if appropriate, of one or more other copolymerizable monomers.

The conjugated diene can be of any type. It is preferable to use $C_4$-$C_6$ conjugated dienes. Particular preference is given to 1,3-butadiene, isoprene, 2,3-dimethylbutadiene, piperylene or a mixture thereof. Particular preference is given to 1,3-butadiene and isoprene or a mixture thereof. 1,3-butadiene is very particularly preferred.

The $\alpha,\beta$-unsaturated nitrile used can comprise any known $\alpha,\beta$-unsaturated nitrile, and preference is given to $C_3$-$C_5$ $\alpha,\beta$-unsaturated nitriles, such as acrylonitrile, methacrylonitrile, ethacrylonitrile or a mixture of these. Acrylonitrile is particularly preferred.

Particularly preferred nitrile rubber is provided by a copolymer based on the monomers acrylonitrile and 1,3-butadiene.

Alongside the conjugated diene and the $\alpha,\beta$-unsaturated nitrile, it is also possible to use one or more other monomers known to the person skilled in the art, examples being $\alpha,\beta$-unsaturated mono- or dicarboxylic acids, or their esters or amides. Preferred $\alpha,\beta$-unsaturated mono- or dicarboxylic acids here are fumaric acid, maleic acid, acrylic acid and methacrylic acid. Preferred esters used of the $\alpha,\beta$-unsaturated carboxylic acids are their alkyl esters and alkoxyalkyl esters. Particularly preferred alkyl esters of the $\alpha,\beta$-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl ester of the $\alpha,\beta$-unsaturated carboxylic acids are methoxyethyl (meth)acrylate, ethoxyethyl (meth)acrylate. Mixtures of alkyl esters, e.g. of those mentioned above, with alkoxyalkyl esters, e.g. in the form of the abovementioned, can also be used.

The proportions of conjugated diene and of $\alpha,\beta$-unsaturated nitrile in the HNBR polymers to be used can vary widely. The proportion of the conjugated diene or of the entirety of the conjugated dienes is usually in the range from 40 to 90% by weight and preferably in the range from 55 to 75%, based on the entire polymer. The proportion of the $\alpha,\beta$-unsaturated nitrile or of the entirety of the $\alpha,\beta$-unsaturated nitriles is usually from 10 to 60% by weight, preferably from 25 to 45% by weight, based on the entire polymer. The proportions of the monomers in each case give a total of 100% by weight. The amounts that can be present of the additional monomers are from 0.1 to 40% by weight, preferably from 1 to 30% by weight, based on the entire polymer. In this case, corresponding proportions of the conjugated diene(s) and, respectively, of the $\alpha,\beta$-unsaturated nitrile(s) are replaced via the proportions of the additional monomers, and the proportions of all of the monomers here in each case give a total of 100% by weight.

If the nitrile rubber has carboxy groups, the term XNBR is also used.

The preparation of the nitrile rubbers via polymerization of the abovementioned monomers is well known to the person skilled in the art and is extensively described in the literature (e.g. Houben-Weyl, Methoden der Organischen Chemie [Methods of organic chemistry], Vol. 14/1, Georg Thieme Verlag Stuttgart 1961).

Other nitrile rubbers which can be used for the purposes of the invention are available commercially, e.g. as products from the product range with trade marks Perbunan® and Krynac® from Lanxess Deutschland GmbH.

Hydrogenated Nitrile Rubbers (HNBR)

For the purposes of this application, hydrogenated nitrile rubbers (HNBR) are co- or terpolymers which contain repeat units of at least one conjugated diene, of at least one $\alpha,\beta$-unsaturated nitrile and, if appropriate, of one or more copolymerizable monomers, and in which the C=C double bonds of the diene units incorporated into the polymer have been hydrogenated entirely or to some extent. The degree of hydrogenation of the diene units incorporated into the polymer is usually in the range from 50 to 100%, preferably in the range from 85 to 100% and particularly preferably in the range from 95 to 100%.

The conjugated diene can be of any type. It is preferable to use $C_4$-$C_6$ conjugated dienes. Particular preference is given to 1,3-butadiene, isoprene, 2,3-dimethylbutadiene, piperylene or a mixture thereof. Particular preference is given to 1,3-butadiene and isoprene or a mixture thereof. 1,3-butadiene is very particularly preferred.

The $\alpha,\beta$unsaturated nitrile used can comprise any known $\alpha,\beta$-unsaturated nitrile, and preference is given to $C_3$-$C_5$ $\alpha,\beta$-unsaturated nitriles, such as acrylonitrile, methacrylonitrile, ethacrylonitrile or a mixture of these. Acrylonitrile is particularly preferred.

Particularly preferred hydrogenated nitrile rubber is provided by a hydrogenated copolymer based on the monomers acrylonitrile and 1,3-butadiene.

Alongside the conjugated diene and the $\alpha,\beta$-unsaturated nitrile, it is also possible to use one or more other monomers known to the person skilled in the art, examples being $\alpha,\beta$-unsaturated mono- or dicarboxylic acids, or their esters or amides. Preferred $\alpha,\beta$-unsaturated mono- or dicarboxylic acids here are fumaric acid, maleic acid, acrylic acid and methacrylic acid. Preferred esters used of the $\alpha,\beta$-unsaturated carboxylic acids are their alkyl esters and alkoxyalkyl esters. Particularly preferred esters of the $\alpha,\beta$-unsaturated carboxylic acids are methyl acrylate, ethyl acrylate, butyl acrylate, butyl methacrylate, 2-ethylhexyl acrylate, 2-ethylhexyl methacrylate and octyl acrylate.

The proportions of conjugated diene and of $\alpha,\beta$-unsaturated nitrile in the HNBR polymers to be used can vary widely. The proportion of the conjugated diene or of the entirety of the conjugated dienes is usually in the range from 40 to 90% by weight and preferably in the range from 55 to 75%, based on the entire polymer. The proportion of the $\alpha,\beta$-unsaturated nitrile or of the entirety of the $\alpha,\beta$-unsaturated nitriles is usually from 10 to 60% by weight, preferably from 25 to 45% by weight, based on the entire polymer. The proportions of the monomers in each case give a total of 100% by weight. The amounts that can be present of the additional monomers are from 0.1 to 40% by weight, preferably from 1 to 30% by weight, based on the entire polymer. In this case, corresponding proportions of the conjugated diene(s) and, respectively, of the $\alpha,\beta$-unsaturated nitrile(s) are replaced via the proportions of the additional monomers, and the proportions of all of the monomers here in each case give a total of 100% by weight.

If the hydrogenated nitrile rubber has carboxy groups, the term HXNBR is also used.

First, the nitrile rubbers, NBR, are prepared via polymerization of the abovementioned monomers. The hydrogenation of the nitrile rubbers to give hydrogenated nitrile rubber then takes place. This can take place in the manner known to the person skilled in the art. By way of example, a suitable method is reaction with hydrogen with use of homogeneous catalysts, e.g. the catalyst known as "Wilkinson" catalyst $((PPh_3)_3RhCl)$ or others. Processes for the hydrogenation of nitrile rubber are known. Rhodium or titanium are usually used as catalysts, but platinum, iridium, palladium, rhenium, ruthenium, osmium, cobalt or copper can also be used either in the form of metal or else preferably in the form of metal compounds (see, for example, U.S. Pat. No. 3,700,637, DE-PS-2 539 132, EP-A-134 023, DE-A-35 41 689, DE-A-35 40

918, EP-A-298 386, DE-A-35 29 252, DE-A-34 33 392, U.S. Pat. No. 4,464,515 and U.S. Pat. No. 4,503,196).

Suitable catalysts and solvents for homogeneous-phase hydrogenation are described below and are also disclosed in DE-A-25 39 132 and EP-A-0 471 250.

Selective hydrogenation can be achieved, for example, in the presence of a rhodium-containing catalyst. By way of example, a catalyst of the general formula

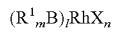

$(R^1_m B)_l RhX_n$ can be used, in which $R^1$ are identical or different and are a $C_1$-$C_8$-alkyl group, a $C_4$-$C_8$-cycloalkyl group, a $C_6$-$C_{15}$-aryl group or a $C_7$-$C_{15}$-aralkyl group, B is phosphorus, arsenic, sulphur or a sulphoxide group S=O, X is hydrogen or an anion, preferably halogen and particularly preferably chlorine or bromine, l is 2, 3 or 4, m is 2 or 3 and n is is 1, 2 or 3, preferably 1 or 3.

Preferred catalysts are tris(triphenylphosphine)rhodium(I) chloride, tris(triphenylphosphine)rhodium(III) chloride and tris(dimethyl sulphoxide)rhodium(III) chloride, and also tetrakis(triphenylphosphine)rhodium hydride of the formula $(C_6H_5)_3P)_4RhH$ and the corresponding compounds in which the triphenylphosphine has been entirely or to some extent replaced by tricyclohexylphosphine. Small amounts of the catalyst can be used. A suitable amount is in the range from 0.01 to 1% by weight, preferably in the range from 0.03 to 0.5% by weight and particularly preferably in the range from 0.1 to 0.3% by weight, based on the weight of the polymer.

It is usually advisable to use the catalyst together with a co-catalyst which is a ligand of the formula $R^1_m B$, where $R^1$, m and B are as defined above for the catalyst. m is preferably equal to 3, B is preferably equal to phosphorus, and the radicals $R^1$ can be identical or different. The co-catalysts preferably have trialkyl, tricycloalkyl, triaryl, triaralkyl, diarylmonoalkyl, diarylmonocycloalkyl, dialkylmonoaryl, dialkylmonocycloalkyl, dicycloalkylmonoaryl or dicycloalkylmonoaryl radicals.

Suitable co-catalysts are found by way of example in U.S. Pat. No. 4,631,315. Triphenylphosphine is preferred co-catalyst. The amounts used of the co-catalyst are preferably from 0.3 to 5% by weight, preferably in the range from 0.5 to 4% by weight, based on the weight of the nitrile rubber to be hydrogenated. The ratio by weight of the rhodium-containing catalyst to the co-catalyst is moreover preferably in the range from 1:3 to 1:55, preferably in the range from 1:5 to 1:45. A suitable method uses from 0.1 to 33 parts by weight of the co-catalyst, preferably from 0.5 to 20 parts by weight and very particularly preferably from 1 to 5 parts by weight, in particular more than 2 but less than 5 parts by weight, of co-catalyst, based on 100 parts by weight of the nitrile rubber to be hydrogenated.

The practical method for this hydrogenation is well known to the person skilled in the art from U.S. Pat. No. 6,683,136. In the usual method, the nitrile rubber to be hydrogenated is treated with hydrogen in a solvent such as toluene or monochlorobenzene at a temperature in the range from 100 to 150° C. and at a pressure in the range from 50 to 150 bar for from 2 to 10 h.

For the purposes of this invention, hydrogenation is a reaction of the C=C double bonds present in the starting nitrile rubber, the extent of this reaction usually being at least 50%, preferably at least 75%, and particularly preferably at least 85%, based on the double bonds present in the starting nitrile rubber.

The hydrogenated nitrile rubbers which are used as starting material in the inventive process usually have a weight-average molecular weight $M_w$ in the range from 200 000 to 1 000 000, preferably in the range from 200 000 to 400 000 and particularly preferably in the range from 200 000 to 300 000. They moreover have a polydispersity index $D=M_w/M_n$, where $M_w$ is the weight-average molecular weight and $M_n$ is the number-average molecular weight, in the range from 1.9 to 6.0, preferably in the range from 2.2 to 5.0 and in particular in the range from 2.5 to 4.0.

The Mooney viscosity of the hydrogenated nitrile rubbers (A) used in the inventive process (ML 1+4 @ 100° C.) is in the range from 50 to 130, preferably from 55 to 75. The Mooney viscosity is determined here to ASTM standard D1646.

Hydrogenated nitrile rubbers of this type are commercially available. Examples of hydrogenated nitrile rubber are fully and partially hydrogenated nitrile rubbers with acrylonitrile contents in the range from 20 to 50% by weight (Therban® range from Lanxess Deutschland GmbH, and also Zetpol® range from Nippon Zeon Corporation). Examples of hydrogenated butadiene-acrylonitrile-acrylate polymers are the Therban®LT range from Lanxess Deutschland GmbH, e.g. Therban®LT 2157, and also Therban®VP KA 8882. An example of carboxylated hydrogenated nitrile rubbers is the Therban®XT range from Lanxess Deutschland GmbH. Examples of hydrogenated nitrile rubbers with low Mooney viscosities and therefore with improved processability are products from the Therban® AT range, e.g. Therban AT VP KA 8966.

Ethylene-Vinyl Acetate Copolymers (EVM)

The inventive process can also use ethylene-vinyl acetate copolymers based on ethylene and vinyl acetate as monomers.

Ethylene-vinyl acetate copolymers which can be used for the purposes of the invention are commercially available, e.g. as products from the product range with trade name Levapren® and Levamelt® from Lanxess Deutschland GmbH, or else can be prepared by the familiar methods known to the person skilled in the art.

EPDM Rubbers

EPDM rubbers are polymers prepared via terpolymerization of ethylene and of relatively large proportions of propylene, and also of a few % by weight of a third monomer having diene structure. The diene monomer here provides the double bonds needed for any subsequent sulphur vulcanization. Diene monomers mainly used are cis,cis-1,5-cyclooctadiene (COD), exo-dicyclopentadiene (DCP), endo-dicyclopentadiene (EDCP), 1,4-hexadiene (HX) and also 5-ethylidene-2-norbornene (ENB).

EPDM rubbers which can be used for the purposes of the invention are commercially available, e.g. as products from the product series with trade name Buna EP® from Lanxess Buna GmbH, or else can be prepared by the methods familiar to the person skilled in the art.

Emulsions Styrene-Butadiene Rubber (ESBR)

This always involves copolymers composed of the monomers styrene and butadiene. The materials are prepared via emulsion polymerization in water, initiated by redox initiators at low temperatures or at relatively high temperatures by persulphates. Latices are obtained and are used as they stand or else worked up to give solid rubber. The molar masses of ESBR are in the range from about 250 000 to 800 000 g/mol.

Emulsion styrene-butadiene rubbers which can be used for the purposes of the invention are commercially available, e.g.

as products from the product range with trade name Krynol® and Krylene® from Lanxess Deutschland GmbH, or else can be prepared by methods familiar to the person skilled in the art.

Chloroprene Rubber (CR)

Chloroprene rubbers (CR) involve polymers based on chloroprene (chloro-1,3-butadiene), these being prepared industrially via emulsion polymerization. Preparation of CR can use not only chloroprene but also one or more other monomers.

Chloroprene rubbers (CR) which can be used for the purposes of the invention are available commercially, e.g. as products from the product range with trade name Baypren® from Lanxess Deutschland GmbH, or else can be prepared by methods familiar to the person skilled in the art.

Polybutadiene Rubbers (BR)

These involve poly(1,3-butadiene), a polymer based on 1,3-butadiene.

Acrylate Rubbers (ACM)

Acrylate rubbers involve copolymers prepared by a free-radical route in emulsion and composed of ethyl acrylate with other acrylates, such as butyl acrylate, 2-alkoxyethyl acrylates or other acrylates having, incorporated into the polymer, small proportions of groups which are active in vulcanization.

ACM rubbers which can be used for the purposes of the invention are commercially available, e.g. as products from the product range with trade name Hy Temp®/Nipol® AR from Zeon Chemicals, or else can be prepared by methods familiar to the person skilled in the art.

Fluororubbers (FKM)

These involve copolymers, prepared by a free-radical route in emulsion, of fluorinated ethylene monomers with fluorinated vinyl monomers and also, if appropriate, with other monomers, where these bear groups which are active in vulcanization.

FKM rubbers which can be used for the purposes of the invention are commercially available, e.g. as products from the product range with trade name Viton® from DuPont des Nemours, or else can be prepared by methods familiar to the person skilled in the art.

IIR and Halo IIR (BIIR and CIIR)

Butyl rubbers (IIR) are a copolymer composed of isobutene and of small proportions of isoprene. They are prepared by a cationic polymerization process.

Halobutyl rubbers (BIIR and CIIR) are prepared therefrom via reaction with elemental chlorine or bromine.

Butyl rubbers and halobutyl rubbers which can be used for the purposes of the invention are commercially available, e.g. as products from the product range with trade name Lanxess Butyl and Lanxess Chlorobutyl and, respectively, Lanxess Bromobutyl from Lanxess Deutschland GmbH, or else can be prepared by methods familiar to the person skilled in the art.

The person skilled in the art can also find further details of the preparation of all of the abovementioned synthetic rubbers (A) via polymerization of the corresponding monomers in the literature (e.g. Houben-Weyl, Methoden der Organischen Chemie [Methods of organic chemistry], Vol. 14/1, Georg Thieme Verlag Stuttgart 1961).

The synthetic rubbers (A), e.g. the abovementioned, which are used as starting material in the inventive process usually have a weight-average molecular weight $M_w$ in the range from 200 000 to 1 000 000, preferably in the range from 200 000 to 400 000 and particularly preferably in the range from 200 000 to 300 000. They moreover have a polydispersity index $D=M_w/M_n$, where $M_w$ is the weight-average molecular weight and $M_n$ is the number-average molecular weight, in the range from 1.9 to 6.0, preferably in the range from 2.2 to 5.0 and in particular in the range from 2.5 to 4.0.

The Mooney viscosity of the synthetic rubbers (A) used in the inventive process (ML 1+4 @ 100° C.) is in the range from 40 to 130, preferably from 45 to 130, particularly preferably from 55 to 75. The Mooney viscosity is determined here to ASTM standard D1646.

The inventive effect of ultrasound is the input of sonic energy with a frequency of at least 18 kHz, preferably in the range from 18 to 30 kHz and in particular in the range from 19 to 25 kHz.

The input of the energy here is a function of the frequency irradiated. The higher the frequency, the lower the energy input. "High-energy ultrasound" is the term used at frequencies up to 100 kHz. Very particular preference is given here to the use of ultrasound with a frequency in the region of 20 kHz.

The input of the energy takes place via immersion of a sonotrode into a solution, in a solvent, of the synthetic rubbers (A) to be treated.

A batchwise method or else a continuous method can be used to carry out the inventive process.

In the case of a batchwise method, i.e. a batch procedure, operations are carried out in a stirred or non-stirred reactor.

It is also possible to achieve the energy input in a continuous procedure. In this, by way of example, a CSTR-type continuous-flow reactor (continuous stirred tank reactor) can be used, with a single pass or plurality of passes in a circulation procedure. It is also possible to use a plurality of CSTRs arranged one after the other in series to carry out the inventive process. A continuous-flow tubular reactor is equally suitable with use of an appropriate number of sonotrodes.

The effect of the ultrasound on the synthetic rubbers (A) takes place in solution. The molecular chains here are cleaved via application of mechanical forces (see also "Applied Sonochemistry", Editors: T. J. Mason, J. P. Lorimer, Wiley-VCH Verlag, Weinheim, 2002). The high shear forces which lead to the cleavage of the molecular chains arise via cavitation. This is the term used for the production and sudden collapse of gas bubbles in a liquid.

The solvents used can comprise any solvents suitable for the respective rubber, examples being dichloromethane, benzene, toluene, cyclohexane and others.

The only limit on the concentration of the synthetic rubber (A) in the solvent is the resultant viscosity of the solution. However, it has been found that degradation of molecular weight proceeds more effectively as the concentration becomes lower, other conditions being identical. Operations usually use an initial concentration of from 0.5 to 15% by weight, preferably from 1.0 to 7.5% by weight, of the synthetic rubber (A) in the solvent.

Input of the ultrasound energy is possible within a wide range of temperature and pressure. The inventive process is usually carried out at a temperature in the range from −30 to 100° C. It has been found that low temperatures have a favourable effect on the chain-degradation reaction. The inventive process is therefore preferably carried out at temperatures in the range from −20 to 50° C.

The inventive process is usually carried out in a pressure range from 1 to 5 bar.

In the inventive process it is also possible, of course, to use mixtures of various synthetic rubbers (A) and to expose them to ultrasound treatment. A mixture of synthetic rubbers (B) is then accordingly obtained.

A feature of the synthetic rubbers (B) obtained in the inventive process is particularly narrow molecular weight distribution and a correspondingly low value for the polydispersity index.

The invention further provides synthetic rubbers selected from the group consisting of nitrile rubbers (NBR), hydrogenated nitrile rubbers (HNBR), ethylene-vinyl acetate copolymers (EVM), EPDM rubbers, emulsion styrene-butadiene rubber (ESBR), chloroprene rubbers (CR), polybutadiene rubbers (BR), acrylate rubbers (ACM), fluororubbers (FKM), IIR and halo IIR, preferably BIIR and CIIR, with a polydispersity $D=M_w/M_n$ which is smaller than or equal to 2, preferably smaller than 2, particularly preferably smaller than 1.9 and very particularly preferably smaller than 1.7. In particular, D is greater than 1 and smaller than 2.0, and D is particularly preferably greater than 1 and smaller than 1.9.

The synthetic rubbers (B) obtained in the inventive process have a lower weight-average molecular weight $M_w$ than the synthetic rubbers (A) used. The weight-average molecular weight $M_w$ of the synthetic rubbers (B) is usually in the range from 30 000 to 250 000, preferably in the range from 30 000 to 150 000 and particularly preferably in the range from 30 000 to 100 000.

The Mooney viscosity of the synthetic rubbers (B) obtained in the inventive process (ML 1+4 @ 100° C.) is in the range from 1 to 50, preferably in the range from 10 to 40. The Mooney viscosity is determined here to ASTM standard D1646.

Surprisingly, this ultrasound-treatment route is successful for the first time in providing synthetic rubbers which have an extremely narrow molecular weight distribution, when comparison is made with the synthetic rubbers obtained from the polymerization process. It appears that the cleavage of the chemical bonds in the synthetic rubber used via the mechanical cleavage process does not, unlike in chemical bond cleavage, proceed randomly, i.e. that not all of the bonds in the polymer chain are equally "reactive".

The inventive synthetic rubbers having low molecular weight and narrow molecular weight distribution have very good processability.

The invention therefore also provides a method of producing mouldings comprising subjecting the synthetic rubber (B) to an extrusion process or to an injection-moulding process.

The invention further provides mouldings which are produced from the inventive synthetic rubbers selected from the abovementioned group. The methods that can be used for this by way of example, such as injection-moulding processes or extrusion processes, and also the corresponding injection-moulding apparatus or extruders, are well known to the person skilled in the art. When producing these mouldings it is also possible to add, to the inventive synthetic rubbers selected from the abovementioned group, the familiar auxiliaries which are known to the person skilled in the art and which are to be selected by that person in a suitable manner using conventional technical knowledge, examples being fillers, filler activators, accelerators, crosslinking agents, ozone stabilizers, antioxidants, processing oils, extender oils, plasticizers, activators or inhibitors to prevent premature vulcanization.

Examples of products preferably produced from the inventive synthetic rubbers from the abovementioned group are gaskets, hoses, damping elements, stators or cable sheathing.

It is also possible to use the inventively prepared synthetic rubbers for the production of tires.

EXAMPLES

The progress of the chain-degradation reaction is determined via gel permeation chromatography (GPC). A modulus system was used with Shodex RI-71 differential refractometer, S 5200 autosampler (SFD), column oven (ERC-125), Shimadzu LC 10 AT pump and a column combination composed of 3 mixed-B columns from Polymer Labs. Tetrahydrofuran was used as solvent and the resultant molecular weights are based on polystyrene standards from PSS (Mainz).

The molecular parameters such as number-average molecular weight ($M_n$), weight-average molecular weight ($M_w$) and the polydispersity index D resulting from these are determined from the RI signal using "Millennium" software from Waters.

Examples 1-3

Nitrile Rubbers (NBR), Batch Procedure)

160 g of a solution of 1% by weight of NBR of different acrylonitrile content (Example 1: Perbunan® 1846; Example 2: Perbunan® 3431, Example 3: Krynac® 4975F; all commercially available products from Lanxess Deutschland GmbH) in monochlorobenzene was irradiated with ultrasound in a stainless steel reactor thermostated at 30° C. over a period of 3 h.

The source used for the sonic energy was UIP 1000 equipment from Dr Hielscher, (maximum power 1000 watt, frequency 20 kHz, BS34 sonotrode with diameter 34 mm composed of titanium, variable amplitude). The amplitude selected was 50% of maximum power.

The specimens taken at regular intervals were characterized by means of GPC with respect to the molecular parameters. The results are shown in Table 1.

TABLE 1

Perbunan ® 1846
(Mooney viscosity (ML 1 + 4 @ 100° C.) 45 MU,
acrylonitrile content 18% by weight)

| Sonic irradiation time (h) | Number-average $M_n$ | Weight-average $M_w$ | Polydispersity D |
|---|---|---|---|
| 0 (= initial value) | 111 000 | 348 000 | 3.1 |
| 1 | 89 000 | 144 000 | 1.6 |
| 2 | 81 000 | 121 000 | 1.5 |
| 3 | 74 000 | 106 000 | 1.4 |

TABLE 2

Perbunan ® 3431
(Mooney viscosity (ML 1 + 4 @ 100° C.) 30 MU,
acrylonitrile content 34% by weight)

| Sonic irradiation time (h) | Number-average $M_n$ | Weight-average $M_w$ | Polydispersity D |
|---|---|---|---|
| 0 (= initial value) | 74 000 | 239 000 | 3.2 |
| 1 | 58 000 | 97 000 | 1.7 |
| 2 | 51 000 | 78 000 | 1.5 |
| 3 | 46 000 | 68 000 | 1.5 |

TABLE 3

Krynac ® 4975F
(Mooney viscosity (ML 1 + 4 @ 100° C.) 70 MU,
acrylonitrile content 49% by weight)

| Sonic irradiation time (h) | Number-average $M_n$ | Weight-average $M_w$ | Polydispersity D |
|---|---|---|---|
| 0 (= initial value) | 80 000 | 193 000 | 2.4 |
| 1 | 62 000 | 94 000 | 1.5 |

TABLE 3-continued

Krynac ® 4975F
(Mooney viscosity (ML 1 + 4 @ 100° C.) 70 MU,
acrylonitrile content 49% by weight)

| Sonic irradiation time (h) | Number-average $M_n$ | Weight-average $M_w$ | Polydispersity D |
|---|---|---|---|
| 2 | 54 000 | 83 000 | 1.5 |
| 3 | 51 000 | 75 000 | 1.5 |

Example 4

Emulsion Styrene-Butadiene Rubber (ESBR)

160 g of a solution of 1% by weight of ESBR (Krylene® 1500, styrene content 23.5% by weight, Mooney viscosity (ML 1+4 @ 100° C.) of 55 MU, commercially available product from Lanxess Deutschland GmbH) in toluene were treated analogously to Example 1. The results are shown in Table 4.

TABLE 4

| Sonic irradiation time (h) | Number-average $M_n$ | Weight-average $M_w$ | Polydispersity D |
|---|---|---|---|
| 0 (= initial value) | 151 000 | 446 000 | 2.9 |
| 1 | 93 000 | 145 000 | 1.6 |
| 2 | 85 000 | 120 000 | 1.4 |
| 3 | 75 000 | 106 000 | 1.4 |

Example 5

Emulsion Styrene-Butadiene Rubber (ESBR)

160 g of a solution of 1% by weight of ESBR (polymer fraction of oil-extended ESBR rubber Krynol® 1721, styrene content 40% by weight, Mooney viscosity (ML 1+4 @ 100° C.) of about 110 MU, commercially available product from Lanxess Deutschland GmbH) in toluene were treated analogously to Example 1. The results are shown in Table 5.

TABLE 5

| Sonic irradiation time (h) | Number-average $M_n$ | Weight-average $M_w$ | Polydispersity D |
|---|---|---|---|
| 0 (= initial value) | 211 000 | 756 000 | 3.6 |
| 1 | 114 000 | 165 000 | 1.4 |
| 2 | 91 000 | 127 000 | 1.4 |
| 3 | 81 000 | 111 000 | 1.4 |

Example 6

Chloroprene Rubber (CR)

160 g of a solution of 1% by weight of CR rubber (Baypren® 230, Mooney viscosity (ML 1+4 @ 100° C.) of 102 MU, commercially available product from Lanxess Deutschland GmbH) in toluene were treated analogously to Example 1. The results are shown in Table 6.

TABLE 6

| Sonic irradiation time (h) | Number-average $M_n$ | Weight-average $M_w$ | Polydispersity D |
|---|---|---|---|
| 0 (= initial value) | 265 000 | 765 000 | 2.9 |
| 1 | 101 000 | 136 000 | 1.3 |
| 2 | 84 000 | 109 000 | 1.3 |
| 3 | 74 000 | 97 000 | 1.3 |

Example 7

Ethylene-Vinyl Acetate Rubber (EVM)

160 g of a solution of 1% by weight of EVM rubber (Levapren® 700 HV, Mooney viscosity (ML 1+4 @ 100° C.) of 27 MU, commercially available product from Lanxess Deutschland GmbH) in chlorobenzene were treated analogously to Example 1. The results are shown in Table 7.

TABLE 7

| Sonic irradiation time (h) | Number-average $M_n$ | Weight-average $M_w$ | Polydispersity D |
|---|---|---|---|
| 0 (= initial value) | 87 000 | 314 000 | 3.6 |
| 1 | 81 000 | 132 000 | 1.6 |
| 2 | 60 000 | 103 000 | 1.7 |
| 3 | 60 000 | 93 000 | 1.5 |

Examples 8-12

Hydrogenated Nitrile Rubber (HNBR); (Batch Procedure)

Example 8

160 g of a solution of 1% by weight of HNBR (Therban® 3446 (Lanxess Deutschland GmbH), Mooney viscosity (ML 1+4 @ 100° C.) of 60 MU (determined to ASTM standard D1646), acrylonitrile content 34% by weight, residual double bond content (determined via IR spectroscopy) 4%) in monochlorobenzene were irradiated with ultrasound in a stainless steel reactor with thermostatic control at 30° C. over a period of 3 h.

The source used for the sonic energy was UIP 1000 equipment from Dr Hielscher, (maximum power 1000 watt, frequency 20 kHz, BS34 sonotrode with diameter 34 mm composed of titanium, variable amplitude). The amplitude selected was 50% of maximum power.

The specimens taken at regular intervals were characterized by means of GPC with respect to the molecular parameters. The results are shown in Table 8.

TABLE 8

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 68 000 | 126 000 | 1.9 |
| 2 | 61 000 | 104 000 | 1.7 |
| 3 | 56 000 | 91 000 | 1.6 |

Example 9

Using starting materials and conditions identical with those in Example 8, the temperature was lowered to 0° C. by means of cryostat. The results are shown in Table 9.

TABLE 9

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 67 000 | 116 000 | 1.7 |
| 2 | 59 000 | 93 000 | 1.6 |
| 3 | 55 000 | 81 000 | 1.5 |

Examples 10-12

Batch Procedure

Apparatus settings identical with those in Example 8 were used with a sonic irradiation temperature of 40° C. on a solution of 1% by weight (Example 10), 3% by weight (Example 11) and 5% by weight (Example 12) of Therban®3446. The results are shown in Tables 10-12 below.

TABLE 10

Concentration of Therban ® 3446: 1% by weight

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 70 500 | 137 000 | 1.9 |
| 2 | 65 700 | 113 500 | 1.7 |
| 3 | 64 400 | 101 000 | 1.6 |

TABLE 11

Concentration of Therban ® 3446: 3% by weight

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 80 000 | 162 000 | 2.0 |
| 2 | 76 000 | 140 000 | 1.8 |
| 3 | 74 000 | 125 000 | 1.7 |

TABLE 12

Concentration of Therban ® 3446: 5% by weight

| Sonic irradiation time (h) | Number-average $M_n$ | Weight-average $M_w$ | Polydispersity D |
|---|---|---|---|
| 0 (= initial value) | 81 000 | 264 000 | 3.2 |
| 1 | 79 000 | 182 000 | 2.3 |
| 2 | 81 000 | 166 000 | 2.1 |
| 3 | 76 000 | 151 000 | 2.0 |

Example 13

Hydrogenated Nitrile Rubber (HNBR); (Circulation Procedure)

With apparatus settings the same as those in Example 8, and using a sonic irradiation temperature of 30° C., a solution of 1% by weight of Therban®3446 was pumped from a feed vessel through a continuous-flow reactor and returned to the feed vessel. The volume of the feed vessel here was four times the volume of the reaction space. The pump-circulation velocity was selected in such a way as to give single-pass average residence time of 0.25 h in the reaction space. Specimens were taken from the feed vessel at regular time intervals and the progress of the degradation reaction was checked by means of GPC. The results are shown in Table 13.

TABLE 13

| Sonic irradiation time (h) | Number-average $M_n$ | Weight-average $M_w$ | Polydispersity D |
|---|---|---|---|
| 0 (= initial value) | 81 000 | 264 000 | 3.2 |
| 0.5 | 77 000 | 177 000 | 2.3 |
| 1 | 70 000 | 158 000 | 2.2 |
| 2 | 76 000 | 147 000 | 1.9 |
| 3 | 71 000 | 134 000 | 1.9 |
| 4 | 72 000 | 125 000 | 1.7 |
| 5 | 68 000 | 119 000 | 1.7 |
| 6 | 66 000 | 112 000 | 1.7 |

Example 14

Hydrogenated Nitrile Rubber (HNBR); (Circulation Procedure)

With apparatus settings identical with those in Example 13 and with configuration identical with that in Example 13, a solution of 5% by weight of polymer was circulated through a continuous-flow reactor. The amplitude setting of the ultrasound source was set to maximum power. The pump-circulation velocity was selected in such a way as to give single-pass average residence time of 1 min in the reaction space. Specimens were taken from the feed vessel at regular time intervals and the progress of the degradation reaction was checked by means of GPC. The results are shown in Table 14.

TABLE 14

| Sonic irradiation time (h) | Number-average $M_n$ | Weight-average $M_w$ | Polydispersity D |
|---|---|---|---|
| 0 (= initial value) | 81 000 | 264 000 | 3.2 |
| 0.75 | 81 000 | 194 000 | 2.4 |
| 2 | 79 000 | 182 000 | 2.3 |
| 3 | 74 000 | 169 000 | 2.3 |
| 4 | 82 000 | 164 000 | 2.0 |
| 5 | 72 000 | 155 000 | 2.2 |
| 6 | 79 000 | 152 000 | 1.9 |
| 7 | 76 000 | 146 000 | 1.9 |

Example 15

Hydrogenated Nitrile Rubber (HNBR); (Single-Tank Continuous Procedure)

With apparatus settings the same as those in Example 8, and using a sonic irradiation temperature of 30° C., a solution of 1% by weight of Therban®3446 was pumped from a feed vessel through a continuous-flow reactor and then separately collected. This type of structure corresponds to a single-tank continuous plant. The pump velocity was selected in such a way as to give a single-pass average residence time of 15 min in the reaction space. The result is shown in Table 15.

TABLE 15

| Sonic irradiation time (h) | Number-average $M_n$ | Weight-average $M_w$ | Polydispersity D |
|---|---|---|---|
| 0 (= initial value) | 81 000 | 264 000 | 3.2 |
| 0.25 | 79 000 | 201 000 | 2.5 |

Example 16

Hydrogenated Nitrile Rubber (HNBR); (Simulation of a Continuous Procedure with 6 Tanks in Series)

With apparatus settings the same as those in Example 8, and using a sonic irradiation temperature of 30° C., a solution of 1% by weight of Therban®3446 was pumped from a feed vessel through a continuous-flow reactor and then separately collected. The resultant solution was again passed through the reactor and homogenized. This procedure was carried out a total of six times. This type of procedure represents a simulation of a 6-tank continuous plant and provides the same residence-time profile of the individual elements of volume. The pump velocity was selected so as to give a single-pass average residence time of 15 min in the reaction space. After each pass, a specimen was taken and characterized by means of GPC. The results are shown in Table 16.

TABLE 16

| Number of cycles | Number-average $M_n$ | Weight-average $M_w$ | Polydispersity D |
|---|---|---|---|
| 0 (= initial value) | 81 000 | 264 000 | 3.2 |
| 1 | 79 000 | 201 000 | 2.5 |
| 2 | 77 000 | 173 000 | 2.2 |
| 3 | 79 000 | 159 000 | 2.0 |
| 4 | 77 000 | 150 000 | 2.0 |
| 5 | 75 000 | 142 000 | 1.9 |
| 6 | 73 000 | 137 000 | 1.9 |

What is claimed is:

1. A synthetic rubber selected from the group consisting of nitrile rubbers (NBR), hydrogenated nitrile rubbers (HNBR), ethylene-vinyl acetate copolymers (EVM), EPDM rubbers, emulsion styrene-butadiene rubber (ESBR), chloroprene rubbers (CR), polybutadiene rubbers (BR), acrylate rubbers (ACM), fluororubbers (FKM), IIR and halo IIR, preferably BIIR and CIIR, wherein the synthetic rubber has a polydispersity index (D) of less than 1.9 as calculated via formula (I)

$$D=M_w/M_n \qquad (I),$$

where $M_w$ is weight-average molecular weight, and
$M_n$ is the number-average molecular weight.

2. The synthetic rubber according to claim 1 wherein the polydispersity index is less than 1.7.

3. The synthetic rubber according to claim 1, with a polydispersity index of between 1 and 1.9.

4. The synthetic rubber according to claim 1, wherein the weight-average molecular weight, $M_w$, is from 30,000 to 250,000.

5. The synthetic rubber according to claim 1 having a Mooney viscosity (ML 1+4 @ 100° C.) of from 1 to 50.

6. The synthetic rubber according to claim 1, having a Mooney viscosity (ML 1+4 @ 100° C.) of from 10 to 40.

7. A method of producing a molding, comprising:
   extruding the synthetic rubber according to claim 1 and forming the same into said molding.

8. A method a producing molding, comprising:
   injection-molding the synthetic rubber according to claim 1 and forming the same into said molding.

9. A molding comprising the synthetic rubber according to claim 1.

10. A method of producing tires comprising:
    forming the synthetic rubber according to claim 1 into a tire.

11. A tire comprising the synthetic rubber according to claim 1.

12. The method according to either claim 7 or 8, wherein the molding is selected from the group of gaskets, hoses, damping elements, stators and cable sheathing.

* * * * *